(12) United States Patent
Felke et al.

(10) Patent No.: US 7,260,505 B2
(45) Date of Patent: Aug. 21, 2007

(54) METHOD AND APPARATUS FOR DEVELOPING FAULT CODES FOR COMPLEX SYSTEMS BASED ON HISTORICAL DATA

(75) Inventors: Timothy J. Felke, Glendale, AZ (US); John F. Stone, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 731 days.

(21) Appl. No.: 10/184,594

(22) Filed: Jun. 26, 2002

(65) Prior Publication Data

US 2004/0003318 A1 Jan. 1, 2004

(51) Int. Cl.
G06F 11/30 (2006.01)

(52) U.S. Cl. .................. 702/187; 702/81; 702/182; 702/185; 701/29

(58) Field of Classification Search ............ 702/33–36, 702/57–59, 182–188, 81–84, 108; 701/29
See application file for complete search history.

(56) References Cited

U.S. PATENT DOCUMENTS

| | | | | |
|---|---|---|---|---|
| 4,788,531 A | * | 11/1988 | Corwin et al. | 340/945 |
| 5,463,768 A | * | 10/1995 | Cuddihy et al. | 714/37 |
| 5,491,631 A | * | 2/1996 | Shirane et al. | 701/35 |
| 5,561,760 A | * | 10/1996 | Ferris et al. | 714/25 |
| 5,774,645 A | * | 6/1998 | Beaujard et al. | 714/25 |
| 6,003,808 A | * | 12/1999 | Nguyen et al. | 244/1 R |
| 6,112,150 A | * | 8/2000 | Irons et al. | 701/114 |
| 6,122,575 A | * | 9/2000 | Schmidt et al. | 701/29 |
| 6,125,312 A | * | 9/2000 | Nguyen et al. | 701/35 |
| 6,141,628 A | * | 10/2000 | Worth et al. | 702/185 |
| 6,253,147 B1 | | 6/2001 | Greenstein | |
| 6,343,236 B1 | * | 1/2002 | Gibson et al. | 700/79 |
| 6,415,395 B1 | * | 7/2002 | Varma et al. | 714/37 |
| 6,529,808 B1 | * | 3/2003 | Diem | 701/29 |
| 6,633,997 B1 | * | 10/2003 | Kaneko | 714/5 |
| 6,650,949 B1 | * | 11/2003 | Fera et al. | 700/79 |
| 6,651,034 B1 | * | 11/2003 | Hedlund et al. | 702/183 |
| 6,877,115 B2 | * | 4/2005 | Herman | 714/46 |
| 2002/0007237 A1 | | 1/2002 | Phung et al. | |
| 2002/0193925 A1 | * | 12/2002 | Funkhouser et al. | 701/33 |
| 2002/0198639 A1 | * | 12/2002 | Ellis et al. | 701/33 |

FOREIGN PATENT DOCUMENTS

| | | |
|---|---|---|
| EP | 1072991 A2 | 1/2001 |
| EP | 1079204 A1 | 2/2001 |
| EP | 1089179 A1 | 4/2001 |
| GB | 2312518 A | 10/1997 |

* cited by examiner

*Primary Examiner*—Hal Wachsman
*Assistant Examiner*—Jeffrey R West
(74) *Attorney, Agent, or Firm*—Ingrassia Fisher & Lorenz

(57) ABSTRACT

A method of developing fault codes for complex systems based on historical data that in one aspect is a software program arranged to be installed and to operate on a processor to process the historical data in order to facilitate development of the fault codes, the software program resulting in the processor performing the method including: grouping the historical data into a plurality of observations and a plurality of repairs; analyzing the plurality of repairs to determine associated observation signatures, each of the observation signatures being one or more of the observations; and assigning a fault code to each observation signature.

24 Claims, 7 Drawing Sheets

LOG PAGE NORMALIZATION RELATIONSHIPS

| TYPICAL SYSTEM DESCRIPTIONS |
|---|
| RECIRCULATION FAN |
| STANDBY CABIN PRESSURIZATION CONTROL |
| MANUAL CABIN PRESSURIZATION CONTROL |
| AUTO CABIN PRESSURIZATION CONTROL |
| TURBO FAN |
| TURBO FAN VALVE |

FIG. 3A

| TYPICAL POSITIONS |
|---|
| #1 |
| #2 |
| LEFT |
| RIGHT |
| FORWARD |
| AFT |

FIG. 3B

| TYPICAL SYMPTOMS |
|---|
| DIM |
| INTERMITTENT |
| WEAK |
| MISSING |
| INOP |

FIG. 3C

| TYPICAL CONDITIONS |
|---|
| INFLIGHT |
| ON TAXI |
| ON GROUND |
| IN CRUISE |
| IN AUTO MODE |
| IN MANUAL MODE |

FIG. 3D

| OBSERVATION ID | STANDARD OBSERVATION DESCRIPTION |
|---|---|
| OBS1 | LEFT RECIRCULATION FAN INTERMITTENT ON GROUND |
| OBS2 | RIGHT RECIRCULATION FAN INTERMITTENT ON GROUND |
| OBS3 | LEFT RECIRCULATION FAN INTERMITTENT INFLIGHT |
| OBS4 | RIGHT RECIRCULATION FAN INTERMITTENT INFLIGHT |
| OBS5 | LEFT RECIRCULATION FAN INOP ON GROUND |
| OBS6 | RIGHT RECIRCULATION FAN INOP ON GROUND |
| OBS7 | LEFT RECIRCULATION FAN INOP INFLIGHT |
| OBS8 | RIGHT RECIRCULATION FAN INOP INFLIGHT |

FIG. 3E

| REPAIR INDEX | LOG PAGE NUMBER | AIRCRAFT NUMBER | OBSERVATION(S) |
|---|---|---|---|
| REPAIR 1 | 123 | N777HZ | OBSERVATION 1 |
| REPAIR 1 | 124 | N777HZ | OBSERVATION 1 |
| REPAIR 1 | 125 | N777HZ | OBSERVATION 2 |
| REPAIR 2 | 126 | N777HZ | OBSERVATION 2 |

TABLE 1: STANDARD REPAIR & STANDARD OBSERVATION

REPAIR TO OBSERVATION RELATIONSHIPS

REPAIR TO OBSERVATION RELATIONSHIPS NORMALIZED
FIG. 6
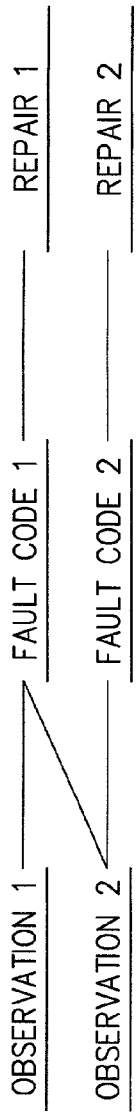
TABLE 2: OBSERVATION SIGNATURES
FIG. 7
| REPAIR ID | TEXT | LOG PAGES | DOC REF | (OBSERVATION SIGNATURE) OBs IDs |
|---|---|---|---|---|
| 1 | REPLACE BRAKE VALVE | 123, 124, 125 | 32-42-01 | 1,2 |
| 2 | SERVICE BRAKE FLUID | 126 | 32-42-12 | 2 |
FAULT CODES
FIG. 8

METHOD AND APPARATUS FOR DEVELOPING FAULT CODES FOR COMPLEX SYSTEMS BASED ON HISTORICAL DATA

FIELD OF THE INVENTION

This invention relates to systems for maintenance of complex systems and more specifically methods and apparatus for developing fault codes from historical data related to such systems.

BACKGROUND OF THE INVENTION

Complex systems comprising tens or hundreds of inter-related and inter-operating systems and subsystems, many which may be complex in there own right, present unique maintenance and service challenges. Examples of such complex systems include factories, major buildings, ocean going vessels, power generation plants, and aircraft to name a few. Complex systems and the inter-related and inter-operational nature of the systems and subsystems thereof often require equally complex and disciplined maintenance and service programs. These programs usually include documentation or records of observed or indicated irregularities or discrepancies and actions taken or services performed pursuant to resolution or prevention of such irregularities and discrepancies. This documentation is usually filled out, completed, or recorded by the service and maintenance personnel.

In the aircraft industry fault codes have more recently come to be used to provide a mechanism to summarize the set of symptoms or syndrome that is reported for each distinct aircraft fault condition. A fault code typically corresponds to a fault condition in a single system on the aircraft and can be used as the basis of fault isolation, material planning and deferral/criticality analysis. Fault Codes are a critical element of a "Fault Model" for an aircraft that can be used to support an automated diagnostic and maintenance support system.

For example Honeywell International Inc. builds an automated expert system called "AMOSS" (Aircraft Maintenance and Operations Support System) that uses fault codes as a standard element in structuring the maintenance activities for an airline and aircraft within that airline. For aircraft designed after the middle of the 1980's, the maintenance documents developed by the manufacturer include Fault Codes. However, aircraft designed prior to the middle of the 1980's (a large percentage of aircraft presently flying) did not include the Fault Code as a part of their maintenance documentation.

For those aircraft and other complex systems that have not employed fault codes or some similar standardization technique, the ability to modify or standardize maintenance and service programs based on historical data is limited since different service technicians are likely to describe similar observations and actions in different terms thus limiting the usefulness of historical information. The airlines have attempted to overcome this limitation through training to instruct their maintenance and service personnel to use various fault classification and reporting strategies for older aircraft. This adds complexity to the maintenance and service procedures, increases costs, and reduces the precision of planning and cost analysis activities. Clearly a need exists for methods and apparatus for developing standard fault codes based on historical data.

SUMMARY OF THE INVENTION

The present invention concerns a method of developing fault codes for complex systems based on historical data where one aspect of this method is a software program comprising software instructions that when installed and operating on a processor results in the processor performing the method. The method includes grouping the historical data into a plurality of observations and a plurality of repairs; analyzing the plurality of repairs to determine associated observation signatures, each of the observation signatures being one or more of the observations; and assigning a fault code to each observation signature. Preferably grouping the historical data into the plurality of observations includes assigning a standard observation to similar discrepancies derived from the historical data and assigning a standard repair to similar corrective actions derived from the historical data and maintaining a first reference to the historical data with each standard observation and a second reference to the historical data with each standard repair.

Analyzing the plurality of repairs may further include discovering relationships between one or more of the standard observations and the standard repairs when the first reference to the historical data and the second reference to the historical data are common between the standard observation and the standard repair. In this instance analyzing the plurality of repairs to determine associated observation signatures may includes grouping each of the standard observations with an associated one of the standard repairs when the relationship is discovered. Then assigning the fault code results in each unique observation signature being assigned a unique fault code and each standard repair with the same observation signature being linked to the same fault code.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3A to FIG. 3E in tabular form illustrates in a simplified and exemplary manner creating standard observations according to the instant invention;

FIG. 6 depicts the resultant relationships between observations and repairs from FIGS. 5A and 5B;

FIG. 7 depicts in tabularized form Observation signatures suitable for use in the flow chart of FIG. 1;

FIG. 8 depicts a diagram of assigned fault codes resulting from the FIG. 1 method.

DETAILED DESCRIPTION OF PREFERRED EMBODIMENT

In overview form the present disclosure concerns and relates to systems for maintenance of complex systems and more specifically methods and apparatus for developing fault codes from historical data related to such systems. More particularly various inventive concepts and principles embodied in methods and apparatus for the systematic development of such standardized fault codes are discussed. The complex systems of particular interest are those associated with aircraft and particularly aircraft designed prior to the mid 1980s, however the concepts and principles discussed herein will be equally applicable to other complex systems.

As further discussed below various inventive principles and combinations thereof are advantageously employed to essentially mine or produce standardized data from historical data, thus alleviating various problems, such as imprecise service and maintenance actions and descriptions and the excess costs associated with known systems while still facilitating quality service and maintenance activities and more precise cost estimates that will result from more systematic forecasts of requisite actions that are enabled by standardized fault codes.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
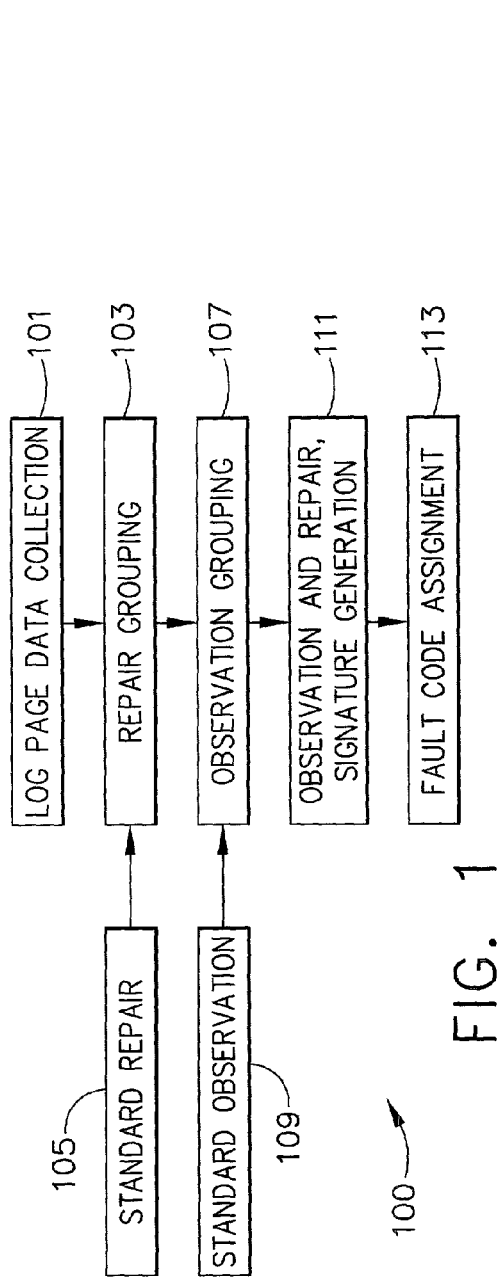
FIG. 1 depicts, in a simplified and exemplary form, a flow chart of a method of developing fault codes according to the present invention.

Referring to FIG. 1 a simplified and exemplary flow chart of a method 100 of developing fault codes from historical data for complex systems is depicted. This method is suitable for implementation in software as part of an automated maintenance and repair support program for use within a, preferably computer based system therefore. In part the method results in construction of or yields a relational database for use within such a system. The method begins at 101 where historical data, specifically log book pages from aircraft maintenance records or similar data from maintenance and service records for other complex systems is reviewed, analyzed, and parsed or broken down into relevant constituent elements that are likely system specific. This will be discussed below in further detail for aircraft historical date with reference to FIG. 2.

Given this historical data, step 103 depicts grouping the historical data or relevant portion thereof into a plurality of repairs or more specifically a group of one or more corrective actions where the grouping function places similar corrective actions derived from the historical data in the same group or repair. Step 105 shows assigning a standard repair such as REPAIR 1 to each of the plurality of repairs or groups of corrective actions so derived. Step 107 shows grouping the historical data or relevant portion thereof into a plurality of observations where each of the plurality of observations is a group of similar discrepancies derived from the historical data. Step 109 depicts assigning a standard observation, such as OBSERVATION 1 to each of the plurality of observations so derived. In the grouping procedures it is preferred that a reference to the historical data, specifically a log page number for the aircraft example, is maintained with each corrective action that is a member of a REPAIR and each discrepancy that is a member of an OBSERVATION. The grouping process allows collections of similar discrepancies and corrective actions to be normalized into a standard textual description. For example, a common corrective action would be to replace the bleed air valve. This may have been written several different ways in the corrective action text of various logbook pages (i.e. R&R BLD AIR VLV, REPLACED BLEED VLV, etc). The grouping activity is preferably performed using known techniques utilizing a Maintenance Manual Table of Contents (MM TOC) section titles as Standard Repairs and a combination of ATA Hierarchy nodes and MM TOC section titles for Standard Observations. Log page discrepancies and corrective actions are then mapped to Standard Observations and Standard Repairs respectively. Optionally, the results of this process are presented to a subject matter expert or experienced engineer for confirmation of the derived relationships. To enhance the quality of Standard Observations (e.g. AIR CONDITIONING), subject matter experts may be used to add Position, Symptom and Fault Condition information. Position information may be placed as a prefix to the Standard Observation (e.g. LEFT, RIGHT, Etc). Symptom information may be used to further describe the failure mode (e.g. INOP, ILLUMINATED, Etc). Fault Conditions describe the aircraft operational mode at the time of failure (e.g. IN FLIGHT, ON GROUND, Etc). A fully normalized Standard Observation could look as follows: LEFT AIR CONDITIONING INOP IN FLIGHT. Note that steps 103 through 109 will be discussed in more detail below with reference to FIGS. 3A-3E and FIG. 4.

Step 111 analyzes the plurality of repairs to determine associated observation signatures where each of the observation signatures includes one or more of the observations. This includes creating relationships between the plurality of observations and the plurality of repairs utilizing the historical data or reference thereto, such as one or more logbook page numbers that are common between an observation and a repair. This will be further discussed below with reference to FIG. 5A, FIG. 5B, and FIG. 6. This results in or allows a grouping of each of the plurality of observations with an associated one of the plurality of repairs to provide a repair signature for each repair that is equal to the group of observations associated therewith and this group of observations is referred to as the observation signature. This is discussed below with reference to FIG. 7.

Step 113 of method 100 shows assigning a fault code to each of the observation signatures. Preferably this results in each unique observation signature having or being assigned a unique fault code. Further each repair with the same observation signature is linked to or associated with the same fault code as will be again reviewed with reference to FIG. 8 below.

Figure 2:
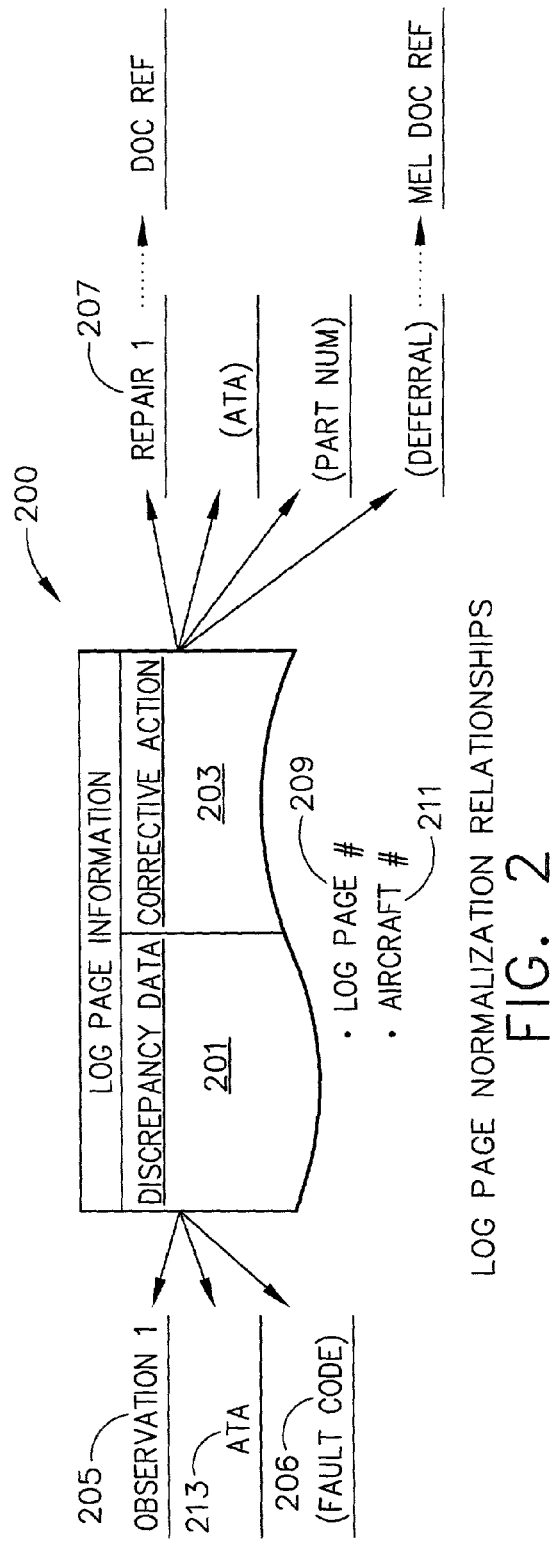
FIG. 2 depicts, in a simplified and representative form, a log page exemplifying an occurrence of historical data.
Figure 4:
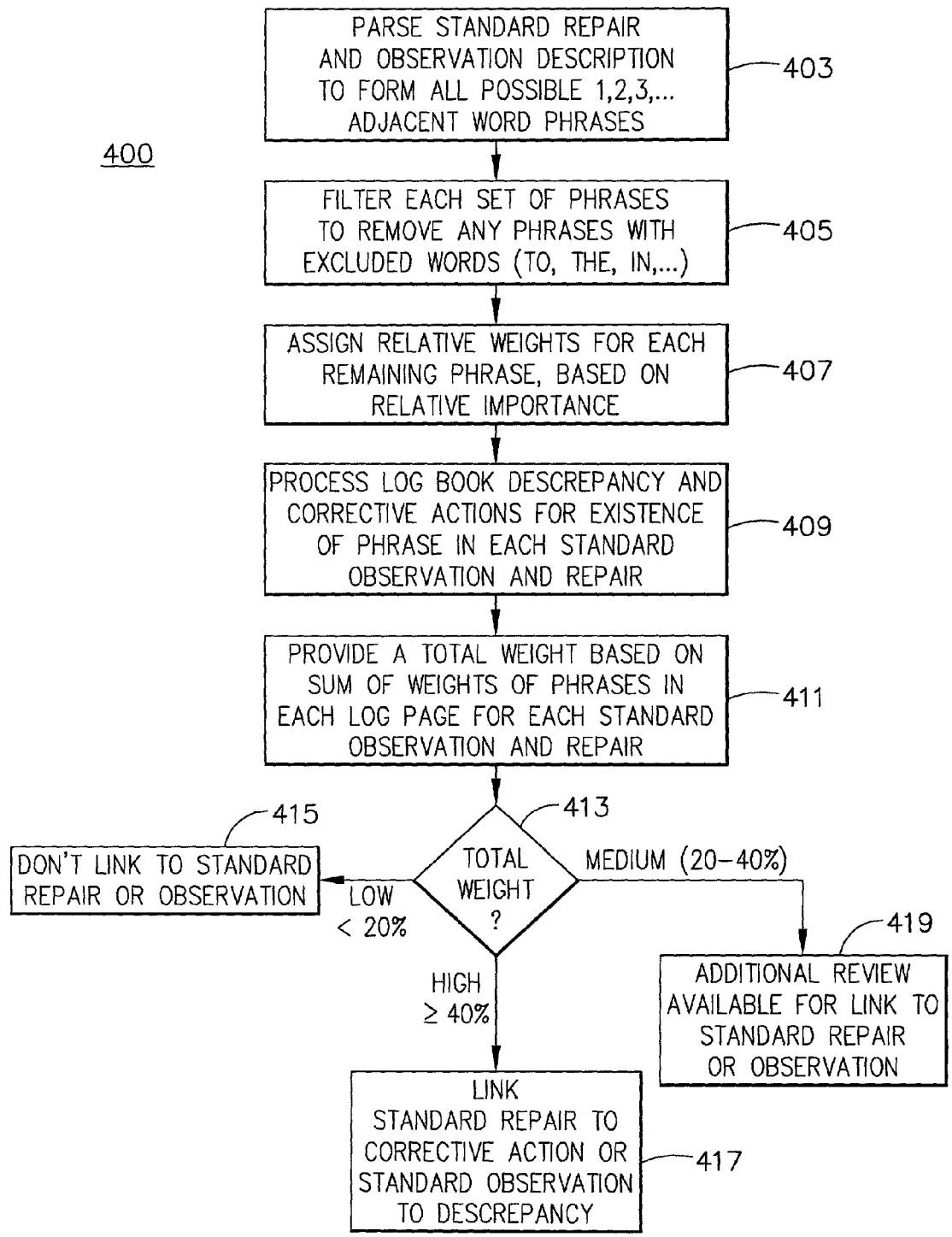
FIG. 4 shows a flow chart of a preferred method of grouping or linking historical information with standard repairs and observations.

FIG. 2 depicts, in a simplified and representative form, a logbook page 200 exemplifying an occurrence of historical data in the aircraft industry. Logbooks break the information into discrepancy 201 and corrective action 203. Discrepancies are best described as human descriptions of malfunctions or irregularities irregularities (e.g. F/O ELEC TRIM SW ON YOKE INOP FOR NOSE UP TRIM, WORKED OK FOR NOSE DOWN TRIM. CAPT TRIM WORKED BOTH DIRECTIONS OK.). The principles and concepts discussed herein will allow a discrepancy to be normalized by a user of these principles and concepts and turned into one to many standard observations, for example OBSERVATION 1 205, (e.g. 1. F/O STAB TRIM YOKE SWITCH NOSE UP INOP; 2. CAPT STAB TRIM YOKE SWITCH NORMAL), and FAULT CODE 206 (e.g. F/O STAB TRIM YOKE SWITCH NOSE UP INOP INFLIGHT, CAPT STAB TRIM YOKE SWITCH NORMAL). Likewise, a corrective action will be normalized to create a repair for example REPAIR 1 207, such as replace bleed air valve. Each repair also includes a reference to one or more documents (DOC REF) such as repair and maintenance manuals.

FIG. 2 shows logbook pages being analyzed to determine the associated discrepancy and corrective actions attributes. Each log page contains a unique log page number 209 and aircraft number 211. The discrepancy data will be normalized into observation text and the observation ATA 213 can usually be derived directly from the log page data. In the aircraft industry ATA is short for an AIR TRANSPORT ASSOCIATION code that is hierarchical with a 2-digit code referring to an aircraft system and a 4-digit code referring to a sub-system. For example, engines and there sub-systems are documented in Chapters 71 to 80. Standard repair text is derived from a synthesis process using an index and provides a list that allows corrective actions to be grouped. In many cases, deferral (deferred repairs) and associated MEL Doc Ref and part information will also be found in the corrective action text.

Referring to FIG. 3A through FIG. 3B the creation of Standard Observations (see 109 in FIG. 1) will be discussed and described. Standard observations are derived from the list of systems included in the Aircraft Maintenance Manual for the particular aircraft. The list of systems is combined with position, symptom and condition information for each system and its fault conditions. Typical system descriptions utilized in standard observation creation are displayed in a simplified and exemplary fashion FIG. 3A and it is understood that the table in FIG. 3A will be extensive for a complex system such as an aircraft. For each aircraft type, a list of positions is created to describe the possible location terminology that will be utilized in the reporting of observations. A sample list of typical positions is displayed in FIG. 3B. FIG. 3C illustrates a sample of the typical symptoms, such as intermittent, no op etc. encountered for various aircraft systems. Condition information can be very relevant to describing the failure mode of system. Conditions can also be referred to as operational modes and exemplary conditions are depicted in FIG. 3D.

Standard observations are then created or assembled by assigning positions, symptoms and conditions to a system description. It is recommended that a tool be developed to assist the end user in defining the relationships between systems, symptoms, positions and conditions. The result for our exemplary circumstances is shown in FIG. 3E. The creation of Standard Repairs (see 105 in FIG. 1) uses the aircraft documentation. These are derived directly from the aircraft maintenance manuals. Each repair is input into the system from a list of repairs available for the aircraft from the document table of contents. Repairs are indexed and the four-digit ATA is recorded.

After developing or determining the Standard Repairs and Standard Observation the grouping process for the historical data is undertaken. This grouping process for an aircraft allows collections of similar discrepancies and corrective actions to be normalized into Standard Repairs and Standard Observations or their respective corresponding standard textual descriptions for each. For example, as noted above a common corrective action would be to replace the bleed air valve. This may have been written several different ways in the corrective action text (i.e. R&R BLD AIR VLV, REPLACED BLEED VLV, etc). While in this simple sample this process may appear straight forward in the real world with lots of actual data this can be become very complicated very quickly with much less certain results, This will be discussed and described below with reference to the FIG. 4 flow chart of a preferred method 400 of grouping or linking historical data such as log page discrepancy and corrective action data to Standard Repairs and Observations.

This method 400 analyzes the words occurring in the Standard Repair and Standard Observation descriptions or descriptive sentences to determine how the words are used within the four-digit ATA structure to create a Standard Phrase List. Standard Repair and Standard Observation descriptions are parsed or broken into phrases including all combinations of one to five adjacent words in step 403. To remain consistent the word "phrase" represents one or more words as shown in step 403. Phrase construction occurs by mapping each word into the 1, 2, 3, 4, 5 or more word phrases in which it occurs in each sentence or description. These phrases include all n-word sub-sentences that include the target word in any position. For example, in the sentence "Replace the Overhead Ventilation Fan", the following phrases would be generated:

The list of phrases is then filtered as shown at 405 to exclude any phrase that includes a word that has been predetermined to be of no value to the word matching process. This is accomplished by maintaining a list of excluded words. Examples of exemplary excluded words would likely include:
To
From
In
A
The
1
2
3
. . .

After filtering the revised list of phrases or remaining phrases would now include the following examples:
Replace
Overhead
Ventilation
Fan
Overhead Ventilation
Ventilation Fan
Overhead Ventilation Fan Once the phrases have been constructed and filtered, they are analyzed to determine the relative Phrase Importance as shown at 407. The analysis includes assigning a weight or Phrase Importance to each of the remaining phrases and thus one or more weights are assigned or correspond to each of the plurality of Standard Observations and the plurality of Standard Repairs. The weight corresponds to a relative importance in resolving an occurrence of historical data into one of the plurality of Standard Observations and Standard Repairs. The weight is a measure that combines the frequency of usage of the words in the phrase along with the degree to which those words are specific to a portion of the aircraft as opposed to words that are broadly used. The weight takes into consideration how often a phrase is used as well as where it is used. Phrases occurring in many ATA chapters many times, for example "Replace", would score very low in importance while words occurring many times in a single ATA chapter would score higher. Additionally, multi-word phrases are scored higher than single-word phrases. This is to account for a multi-word phrase being more valuable than a single-word phrase and also likely to occur fewer times than a single-word phrase. These factors are combined to compute a score or weight for each phrase based on the following algorithm:

$$PI_w = MWC^{0.8} * WP^{1.2} / MWAC^{0.8} * WS, \text{ where}$$

MWC=the maximum number of times this phrase appears n any four-digit ATA,

WP=Words in Phrase,

MWAC=the largest number of occurrences a single word has in a single ATA, a constant in all specific calculations, and WS=total number of four-digit ATAs in which this phrase occurs.

Finally each occurrence of the historical data or here log page discrepancy and corrective action is processed and scored against each Standard Observation and Standard Repair, respectively. Processing the historical data or log pages with discrepancies and corrective actions results in or provides a total weight for each of the Standard Observations and the Standard Repairs, where the total weight corresponds to a sum of weights that correspond to a degree of match between the discrepancies and the corrective actions and descriptions of the Standard Observations and the Standard Repairs. More specifically, in this process, each log page or the relevant text there from is parsed and filtered into phrases in a fashion corresponding to the development of the standard phrases. The resultant phrases are then compared against each individual phrase from the corresponding Standard Observation or Standard Repair for the existence of the phrase as shown at 409. If the phrase exists within the log page, the log page receives a score equivalent to the weight or value of the phrase for the corresponding Standard Observation or Standard Repair from which the phrase originated. Each of these weights or phrase scores is then summed for each Standard Repair and Observation. At the end of this process, Log pages contain a total score or weight for each Standard Repair and Standard Observation based on the phrase matching as shown at 411.

Linking Standard Observations to Discrepancies or Standard Repairs to Corrective Actions or grouping the Discrepancies or Corrective Actions from the log pages into, respectively a Standard Observation or a Standard Repair is then accomplished by testing the total weight or score for the Standard Observation or Standard Repair in question versus the Discrepancy or Corrective Action described in the log page as depicted at 413. If the Standard Observation or Standard Repair has a low score or weight (e.g. <20%), then step 415 indicates that a link between the Discrepancy or Corrective Action on the log page and Standard Observation or Standard Repair is unlikely and therefore is not made. If the total weight is a high score (e.g. > or = to 40%), step 417 indicates that a link between the Standard Observation or Standard Repair at issue and the Discrepancy or Corrective Action is probable and therefore is made. Of course there are scores in between and for those instances step 419 indicates that a linkage will be formed but further review will be made available. Note that this is not all science and an analyst or engineer should review or overview results and indicated linkages. Log page Discrepancies or Corrective Actions with scores over forty percent of the available or possible weight for a Standard Repair are said to be relatively good matches, while those log pages with scores below twenty percent are said to be a poor match. Scores between twenty and forty percent are considered a match but made available for additional review. Entity pairs that score over 40% are automatically "grouped" by the process. Entity pairs that score between 20% and 40% are automatically "linked" by the process. The toolset allows a user to review this data and reject any automatically generated groups and/or group any entity pairs that had been linked.

Figures 5A, 5B:
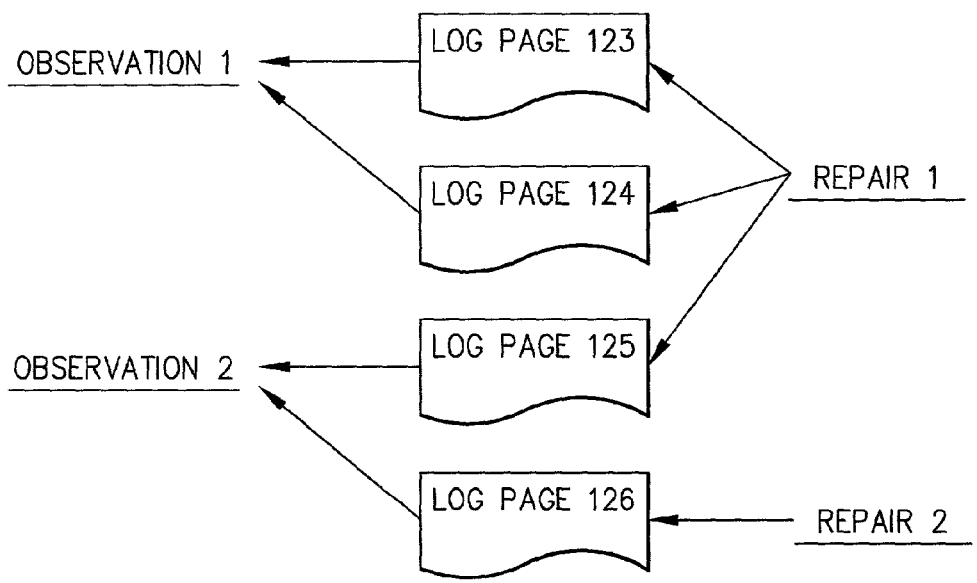
FIGS. 5A and 5B in tabular and graphical form, respectively, illustrates in a simplified and exemplary manner creating relationships between standard repairs and standard observation according to the instant invention.

FIG. 5A and FIG. 5B in tabular and graphical form, respectively, illustrates in a simplified and exemplary manner creating relationships between standard repairs and standard observation according to the instant invention. As repairs are normalized to standard descriptions for a group of similar repairs, a link to the source logbook pages is maintained for each corrective action. This provides one or more linkages or relationships between a REPAIR m and OBSERVATION n as depicted in the table of FIG. 5A. This information and these relationships are also shown in the graphical representation in FIG. 5B. This information can be used as the basis for a majority of a fault model for a particular aircraft including fault codes and co-occurrence counts. In any event in FIG. 5B, we note that repairs and observations have been grouped. Corrective actions on log pages 123, 124 and 125 are found consistent with Repair 1 while the corrective action on page 126 is consistent with Repair 2. The discrepancies written on pages 123 and 124 are grouped and normalized to Observation 1 and the discrepancies on pages 125 and 126 are normalized to Observation 2.

FIG. 6 depicts the resultant relationships between observations and repairs from FIGS. 5A and 5B. Based on the relationships discovered or uncovered by the grouping activity between observations and discrepancies as well as corrective actions and repairs from FIG. 5 the observations or standard observations can be related directly to repairs or standard repairs as shown in FIG. 6. As the data set becomes larger, a comprehensive view of the many to many relationships that exist between the observations and repairs will become more evident.

FIG. 7 depicts in tabularized form observation signatures suitable for use in the flow chart of FIG. 1. Repairs are then analyzed to determine the associated observation signatures. In the case described here, Repair 1 has an observation signature equal to Observation 1 and Observation 2 because both observations occurred with the repair. Repair 2 on the other hand only occurred with Observation 2 and will only have that observation as its observation signature. Assuming a broader data set, we will begin to see a multitude of repairs with the same observation signature.

FIG. 8 depicts a diagram of assigned fault codes resulting from the FIG. 1 method. Fault codes are derived from the observation signatures according to the following rules: Each distinct signature is assigned to a distinct fault code and all repairs that have the same signature are linked to the same fault code. Based on the relationships provided in FIG. 4, the two fault codes illustrated in FIG. 8 can be derived. Table 2 in FIG. 7 depicts the data captured during the normalization process and shows a preferred way that the observation signatures are stored for repairs.

One aspect of the method and preferred embodiment for practicing the method is a software program comprising software instructions arranged to run on a processor to process information derived from historical data in order to facilitate development of fault codes for complex systems based on the data. The software program when installed and operating on a processor that further includes or has access to the appropriate data base results in the processor: grouping the historical data into a plurality of observations and a plurality of repairs; analyzing the plurality of repairs to determine associated observation signatures where each of the observation signatures is one or more of the observations; and then assigning a fault code to each observation signature.

Preferably grouping the historical data into the plurality of observations further includes assigning a standard observation to similar discrepancies derived from the historical data and assigning a standard repair to similar corrective actions derived from the historical data and maintaining a first reference to the historical data with each standard observation and a second reference to the historical data with each standard repair. The process of analyzing the plurality of repairs further, preferably includes discovering relationships between one or more of the standard observations and the standard repairs, the relationship indicated when the first reference to the historical data and the second reference to the historical data are common between a standard observation and a standard repair. By grouping each of the standard observations with an associated one of the standard repairs when the relationship is discovered observation signatures for a given repair will be found. The procedure of assigning the fault code results in each unique observation signature being assigned a unique fault code and each standard repair with the same observation signature being linked to the same fault code.

The software program may further include instructions for determining a plurality of Standard Observations including a description of each of the plurality of Standard Observations and a plurality of Standard Repairs including a description of each of the plurality of Standard Repairs. The process of grouping, preferably, includes assigning one or more weights to each of the descriptions of the plurality of Standard Observations and each of the descriptions of the plurality of Standard Repairs, each of the weights corresponding to a relative importance in resolving the historical data into one of the plurality of Standard Observations and the plurality of said Standard Repairs. The process of grouping may further includes processing the historical data including discrepancies and corrective actions to provide a total weight for each of the Standard Observations and the Standard Repairs, where the total weight corresponds to a sum of the weights and to a degree of match between the discrepancies and the corrective actions and descriptions of the Standard Observations and the Standard Repairs.

Figure 9:
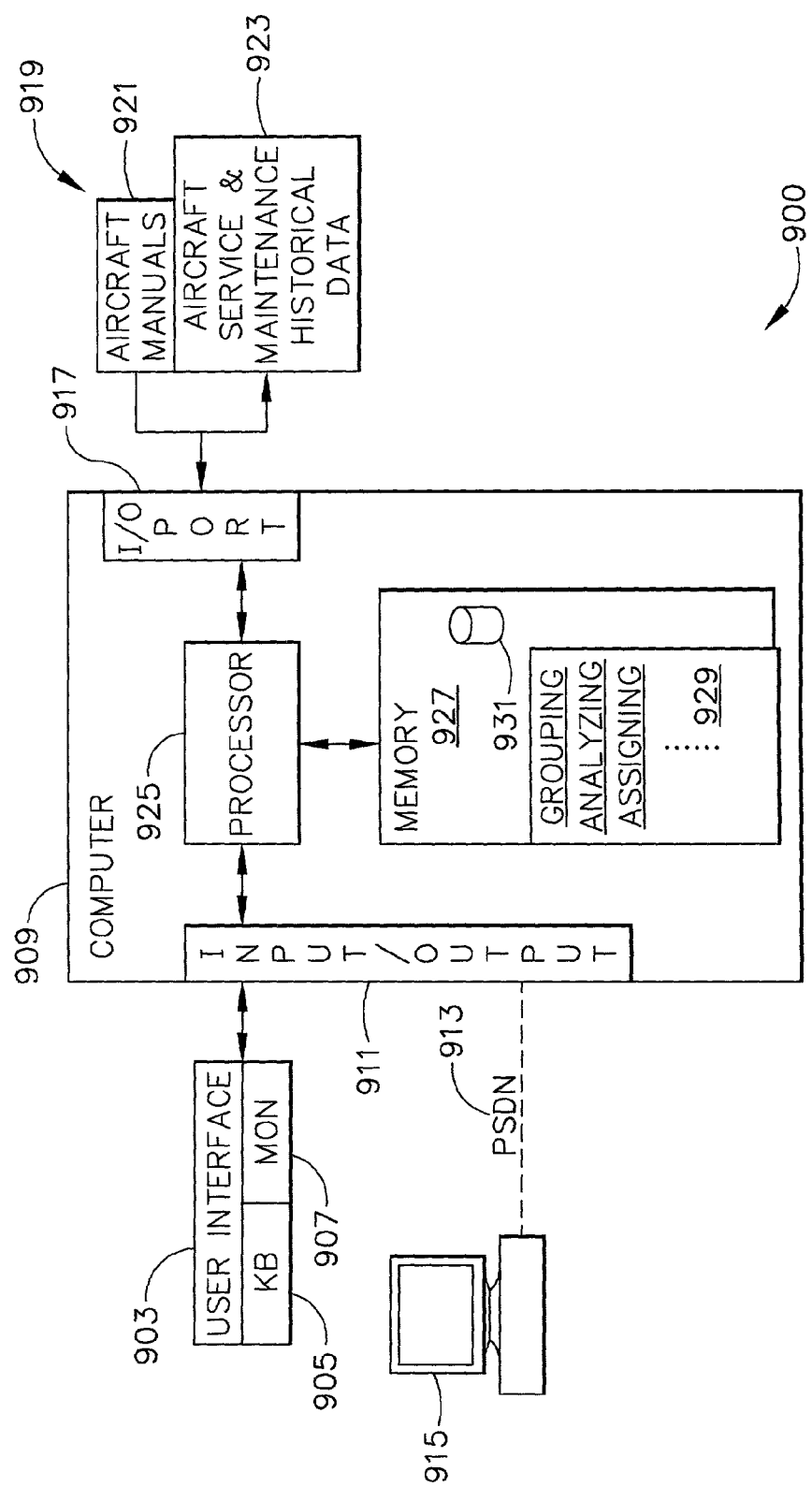
FIG. 9 depicts a computer based system for developing fault codes according to the present invention.

An apparatus embodiment, depicted in FIG. 9, is a computer based system 900 for development of fault codes for complex systems, such as aircraft systems based on historical data. Referring to FIG. 9, the system 900 includes a conventional user interface 903, including a keyboard 905 and monitor 907, that is inter coupled to a computer 909 at an input/output 911; The computer is further arranged and constructed to facilitate access to a public switched data or telephone network (PSDN or PSTN) 913 and thus a plurality of remote users, such as remote user 915. Furthermore the computer, preferably, has access via an I/O port 917 to one or more databases 919 or servers with databases that includes historical information, such as aircraft service and maintenance information and manuals 921 and aircraft service and maintenance logs 923 of historical actions taken and services performed. These databases may be collocated or located at one or more sites that are remote from the computer.

The computer 909 includes a processor 925 inter coupled with the other entities, as shown, and a memory 927. The memory is for storing software instructions 929, such as routines for grouping, analyzing, assigning, etc. as well as conventional operating system routines, and databases 931, specifically including the relational database tat is developed including fault codes and so on by applying the principles and concepts herein disclosed. The processor and memory are known components that operate according to the novel and inventive principles discussed and described above. For example the processor 909 is for executing software instructions to process information derived from historical data in order to facilitate the development of the fault codes. This results in the computer grouping the historical data into a plurality of observations and a plurality of repairs, analyzing the plurality of repairs to determine associated observation signatures, each of the observation signatures being one or more of the observations; and assigning a fault code to each observation signature in addition to the other processing steps noted above.

The processes, discussed above, and the inventive principles thereof are intended to and will alleviate problems, such as inconsistent diagnostics and corrective actions or records thereof caused by prior art maintenance and service procedures. Using these principles of defining fault codes will simplify service and maintenance procedures and save costs associated with inconsistent activities.

Various embodiments of methods, systems, and apparatus for developing standardized fault codes so as to facilitate and provide for consistent and cost effective maintenance and service programs for complex systems have been discussed and described. It is expected that these embodiments or others in accordance with the present invention will have application to many complex systems. The disclosed principles and concepts extend to these systems and specifically to methods employed for maintenance and service thereby and therein. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof, when interpreted in accordance with the breadth to which they are fairly, legally, and equitably entitled.

What is claimed is:

1. A method of identifying fault conditions for complex systems based on historical non-coded data, the method including the steps of:

grouping the historical non-coded data into a plurality of observations and a plurality of repairs;

assigning a Standard Repair of a plurality of Standard Repairs to each of said plurality of repairs and a Standard Observation of Standard Observations to each of said plurality of observations, said plurality of Standard Observations including a description of each of said plurality of Standard Observations and said plurality of Standard Repairs including a description of each of said plurality of Standard Repairs, said description of each of said plurality of Standard Observations and said description of each of said plurality of Standard Repairs comprising a phrase, said step of assigning a Standard Repair of a plurality of Standard Repairs to each of said plurality of repairs and a Standard Observation of a plurality of Standard Observations to each of said plurality of observations comprising assigning one or more weights to each of said descriptions of said plurality of Standard Observations and each of said descriptions of said plurality of Standard Repairs and resolving the historical non-coded data into one of said plurality of Standard Observations and said plurality of said Standard Repairs, each of said one or more weights indicating a phrase importance and corresponding to a relative importance in said resolving said historical data into one of said plurality of Standard Observations and said plurality of said Standard Repairs;

analyzing said plurality of repairs to determine associated observation signatures, each of said observation signatures based on one or more of said plurality of observations;

assigning a fault code to each observation signature, said fault code identifying a fault condition; and communicating the fault code to a user interface.

2. The method of claim 1 wherein said step of assigning a Standard Repair of a plurality of Standard Repairs to each of said plurality of repairs and a Standard Observation of a plurality of Standard Observations to each of said plurality of observations further includes assigning one of said plurality of Standard Observations to similar discrepancies derived from the historical non-coded data and assigning one of said plurality of Standard Repairs to similar corrective actions derived from the historical non-coded data and maintaining a first reference to the historical non-coded data with each said similar discrepancies and a second reference to the historical non-coded data with each said similar corrective actions.

3. The method of claim 2 wherein said step of analyzing said plurality of repairs further includes a step of discovering relationships between one or more of said Standard Observations and said Standard Repairs when said first reference to the historical non-coded data and said second reference to the historical non-coded data are common between said one or more Standard Observations and said one or more Standard Repairs.

4. The method of claim 3 wherein said step of analyzing said plurality of repairs to determine associated observation signatures includes grouping each of said Standard Observation with an associated one of said Standard Repairs when said relationship is discovered.

5. The method of claim 4 wherein said step of assigning said fault code results in each observation signature being assigned a unique fault code and each Standard Repair with the same observation signature being linked to the same fault code.

6. The method of claim 1 wherein said step of analyzing said plurality of repairs further includes a step of creating relationships between said plurality of observations and said plurality of repairs utilizing the historical non-coded data that is common between an observation and a repair.

7. The method of claim 1 wherein said step of analyzing said plurality of repairs to determine associated observation signatures includes grouping each of said plurality of observations with an associated one of said plurality of repairs.

8. The method of claim 1 wherein said step of assigning said fault code results in each observation signature being assigned a unique fault code and each repair with the same observation signature being linked to the same fault code.

9. The method of claim 1 Wherein said step of assigning a Standard Repair of a plurality of Standard Repairs to each of said plurality of repairs and a Standard Observation of a plurality of Standard Observations to each of said plurality of observations further includes a step of processing the historical non-coded data including discrepancies and corrective actions to provide a total weight for each of said Standard Observations and said Standard Repairs, said total weight corresponding to a sum of said weights that correspond to a degree of match between one of said discrepancies and said corrective actions and descriptions of one of said Standard Observations and said Standard Repairs.

10. A computer-readable medium comprising a software program comprising software instructions arranged to run on a processor to process information derived from historical non-coded data in order to identify fault conditions for complex systems based on the historical non-coded data, the software program when installed and operating on a processor resulting in the processor:

grouping the historical non-coded data into a plurality of observations and a plurality of repairs;

assigning a Standard Repair of a plurality of Standard Repairs to each of said plurality of repairs and a Standard Observation of a plurality of Standard Observations to each of said plurality of observations, said plurality of Standard Observations including a description of each of said plurality of Standard Observations and said plurality of Standard Repairs including a description of each of said plurality of Standard Repairs, said description of each of said plurality of Standard Observations and said description of each of said plurality of Standard Repairs comprising a phrase, said step of assigning a Standard Repair of a plurality of Standard Repairs to each of said plurality of repairs and a Standard Observation of a plurality of Standard Observations to each of said plurality of observations comprising assigning one or more weights to each of said descriptions of said plurality of Standard Observations and each of said descriptions of said plurality of Standard Repairs and resolving said historical non-coded data into one of said plurality of Standard Observations and said plurality of said Standard Repairs, each of said one or more weights indicating a phrase importance and corresponding to a relative importance in said resolving said historical non-coded data into one of said plurality of Standard Observations and said plurality of said Standard Repairs;

analyzing said plurality of repairs to determine associated observation signatures, each of said observation signatures based on one or more of said plurality of observations; assigning a fault code to each observation signature, said fault code identifying a fault condition; and communicating the fault code to a user interface.

11. The software program of claim 10 wherein said step of assigning a Standard Repair of a plurality of Standard Repairs to each of said plurality of repairs and a Standard Observation of a plurality of Standard Observations to each of said plurality of observations further includes assigning one of said plurality of Standard Observations to similar discrepancies derived from the historical non-coded data and assigning one of said plurality of Standard Repairs to similar corrective actions derived from the historical non-code data and maintaining a first reference to the historical non-coded data with each said similar discrepancies and a second reference to the historical non-coded data with each said similar corrective actions.

12. The software program of claim 11 wherein said analyzing said plurality of repairs further includes discovering relationships between one or more of said Standard Observations and said Standard Repairs when said first reference to the historical non-coded data and said second reference to the historical non-coded data are common between said one or more Standard Observations and said one or more Standard Repairs.

13. The software program of claim 12 wherein said step of analyzing said plurality of repairs to determine associated observation signatures includes grouping each of said Standard Observations with an associated one of said Standard Repairs when said relationship is discovered.

14. The software program of claim 13 wherein said assigning said fault code results in each observation signature being assigned a unique fault code and each Standard Repair with the same observation signature being linked to the same fault code.

15. The software program of claim 10 wherein said analyzing said plurality of repairs further includes a step of creating relationships between said plurality of observations and said plurality of repairs utilizing the historical non-coded data that is common between an observation and a repair.

16. The software program of claim 11 wherein said analyzing said plurality of repairs to determine associated observation signatures includes grouping each of said plurality of observations with an associated one of said plurality of repairs.

17. The software program of claim 10 wherein said assigning said fault code results in each observation signature being assigned a unique fault code and each repair with the same observation signature being linked to the same fault code.

18. The software program of claim 10 wherein said step of assigning a Standard Repair of a plurality of Standard Repairs to each of said plurality of repairs and a Standard Observation of a plurality of Standard Observations to each of said plurality of observations further includes a step of processing the historical non-coded data including discrepancies and corrective actions to provide a total weight for each of said Standard Observations and said Standard Repairs, said total weight corresponding to a sum of said weights that correspond tot degree of match between one of said discrepancies and said corrective actions and descriptions of one of said Standard Observations and said Standard Repairs.

19. A computer based system for development of fault codes for aircraft systems based on historical non-coded data lacking assigned fault codes, the system comprising in combination:
   a user interface;
   a computer, coupled to the user interface, having memory, for storing software instructions and databases, and a processor for:
      executing said software instructions to process information derived from historical data in order to facilitate the development of the fault codes, the software instructions resulting in the computer:
   grouping the historical non-coded data into a plurality of observations and a plurality of repairs;
   assigning a Standard Repair of a plurality of Standard Repairs to each of said plurality of repairs and a Standard Observation of a plurality of Standard Observations to each of said plurality of observations, said plurality of Standard Observations including a description of each of said plurality of Standard Observations and said plurality of Standard Repairs including a description of each of said plurality of Standard Repairs, said description of each of said plurality of Standard Observations and said description of each of said plurality of Standard Repairs comprising a phrase, said step of assigning a Standard Repair of a plurality of Standard Repairs to each of said plurality of repairs and a Standard Observation of a plurality of Standard Observations to each of said plurality of observations comprising assigning one or more weights to each of said descriptions of said plurality of Standard Observations and each of said descriptions of said plurality of Standard Repairs and resolving said historical non-coded data into one of said plurality of Standard Observations and said plurality of said Standard Repairs, each of said one or more weights indicating a phrase importance and corresponding to a relative importance in said resolving said historical non-coded data into one of said plurality of Standard Observations and said plurality of said Standard Repairs;
   analyzing said plurality of repairs to determine associated observation signatures, each of said observation signatures based on one or more of said plurality of observations;
   assigning a fault code to each observation signature; and communication the fault code to a user interface.

20. The computer based system of claim 19 wherein said assigning a Standard Repair of a plurality of Standard Repairs to each of said plurality of repairs and a Standard Observation of a plurality of Standard Observations to each of said plurality of observations further includes assigning one of said plurality of Standard Observations to similar discrepancies derived from die historical non-coded data and assigning one of said plurality of Standard Repairs to similar corrective actions derived from the historical non-coded data and maintaining a first reference to the historical non-coded data with each said similar discrepancies and a second reference to the historical non-coded data with each said similar corrective actions.

21. The computer based system of claim 19 wherein said analyzing said plurality of repairs further includes creating relationships between said plurality of observations and said plurality of repairs utilizing the historical non-coded data that is common between an observation and a repair.

22. The computer based system of claim 19 wherein said analyzing said plurality of repairs to determine associated observation signatures includes grouping each of said plurality of observations with an associated one of said plurality of repairs.

23. The computer based system of claim 19 wherein said assigning said fault code results in each observation signature being assigned a unique fault code and each repair with the same observation signature being linked to the same fault code.

24. The computer based system of claim 19 wherein said assigning a Standard Repair of a plurality of Standard Repairs to each of said plurality of repairs and a Standard Observation of a plurality of Standard Observations to each of said plurality of observations further includes processing the historical non-coded data including discrepancies and corrective actions to provide a total weight for each of said Standard Observations and said Standard Repairs, said total weight corresponding to a sum of said weights that correspond to a degree of match between one of said discrepancies and said corrective actions and descriptions of one of said Standard Observations and said Standard Repairs.

* * * * *

UNITED STATES PATENT AND TRADEMARK OFFICE
CERTIFICATE OF CORRECTION

PATENT NO. : 7,260,505 B2  Page 1 of 1
APPLICATION NO. : 10/184594
DATED : August 21, 2007
INVENTOR(S) : Timothy J. Felke et al.

It is certified that error appears in the above-identified patent and that said Letters Patent is hereby corrected as shown below:

Column 12, line 9, "Wherein" should be changed to --wherein--;
Column 13, line 53, "tot" should be changed to --to a--; and
Column 14, line 45, "die" should be changed to --the--.

Signed and Sealed this

Fourth Day of December, 2007

JON W. DUDAS
*Director of the United States Patent and Trademark Office*